Aug. 2, 1960
R. J. BROADWELL
2,947,528
DAMPED AIR VALVE
Filed Jan. 2, 1957
3 Sheets-Sheet 3
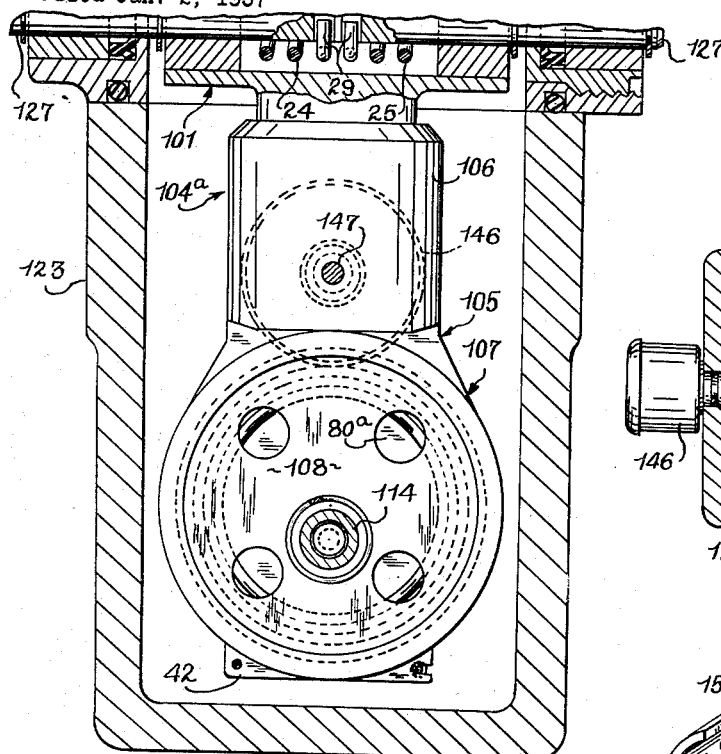
Fig. 8
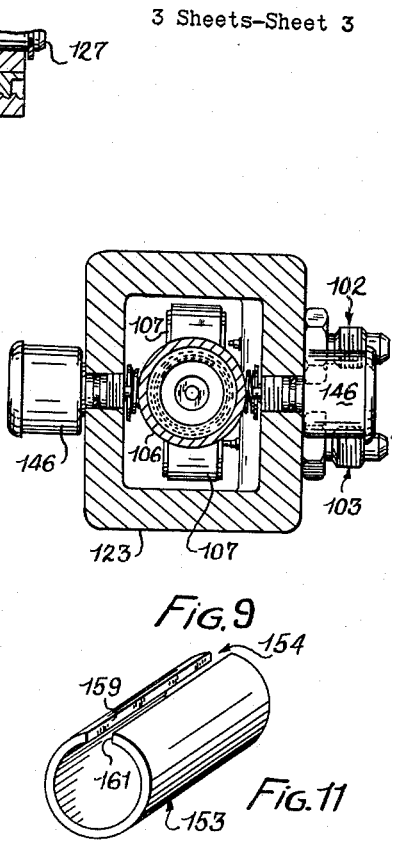
Fig. 9
Fig. 11
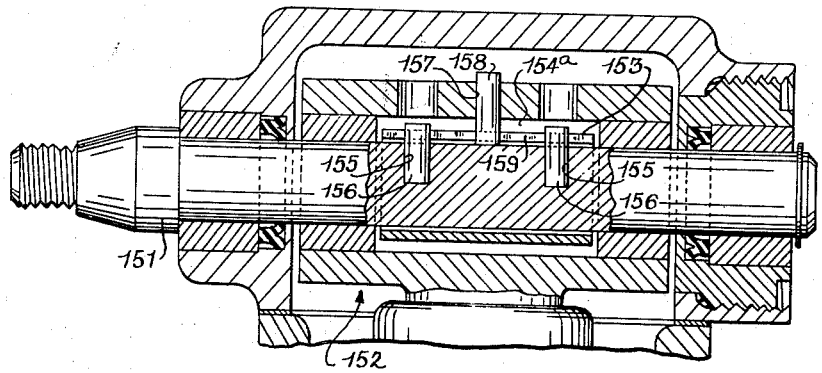
Fig. 10
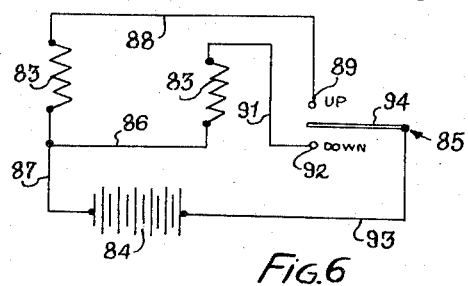
Fig. 6
INVENTOR.
ROBERT J. BROADWELL
BY Hudson, Boughton,
Williams, David & Hoffmann
ATTORNEYS

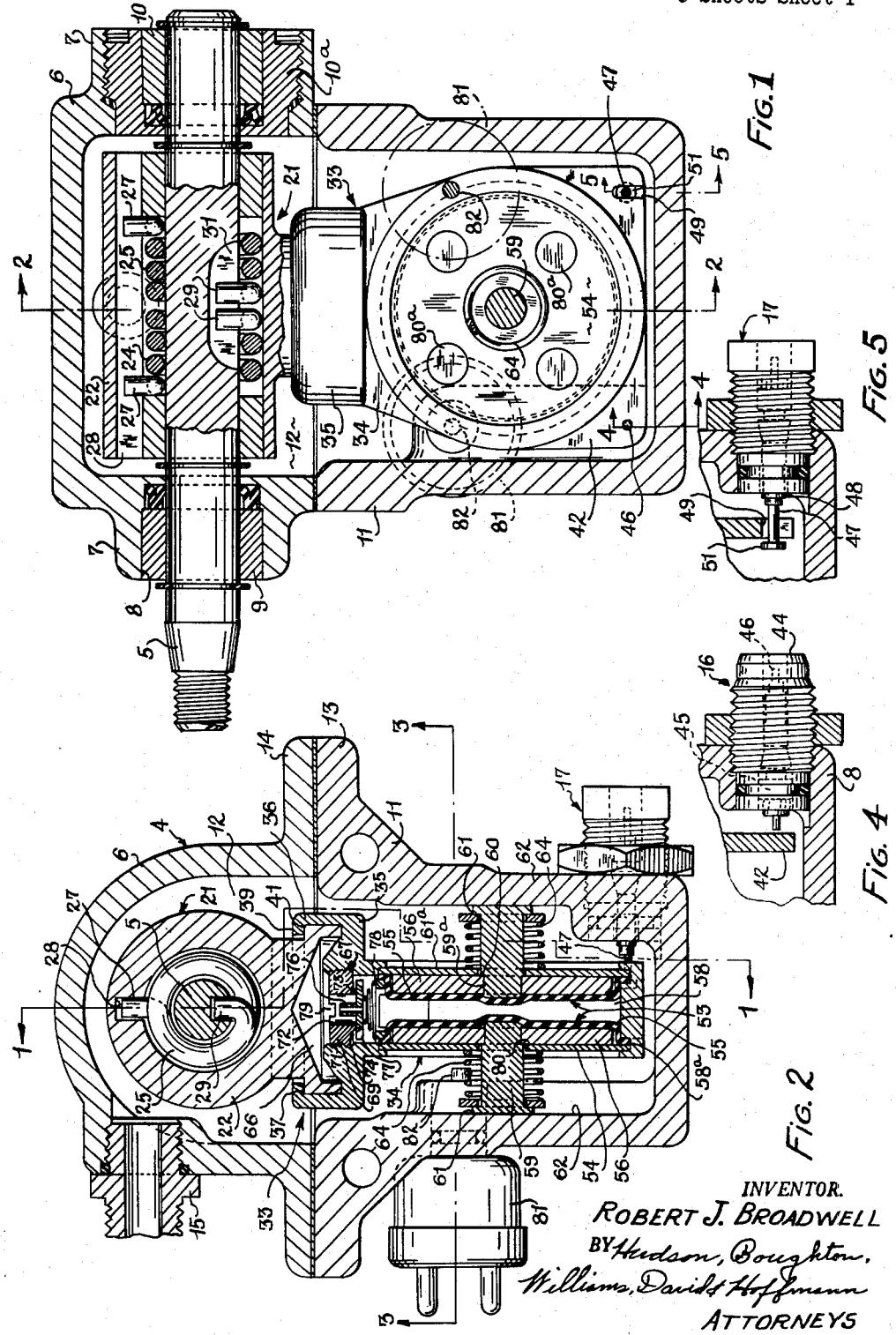

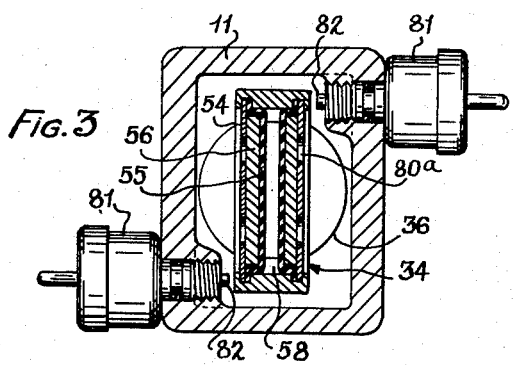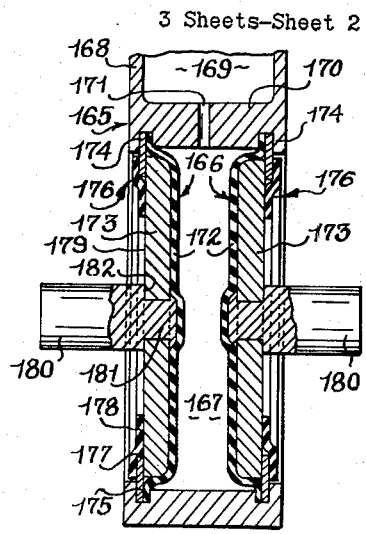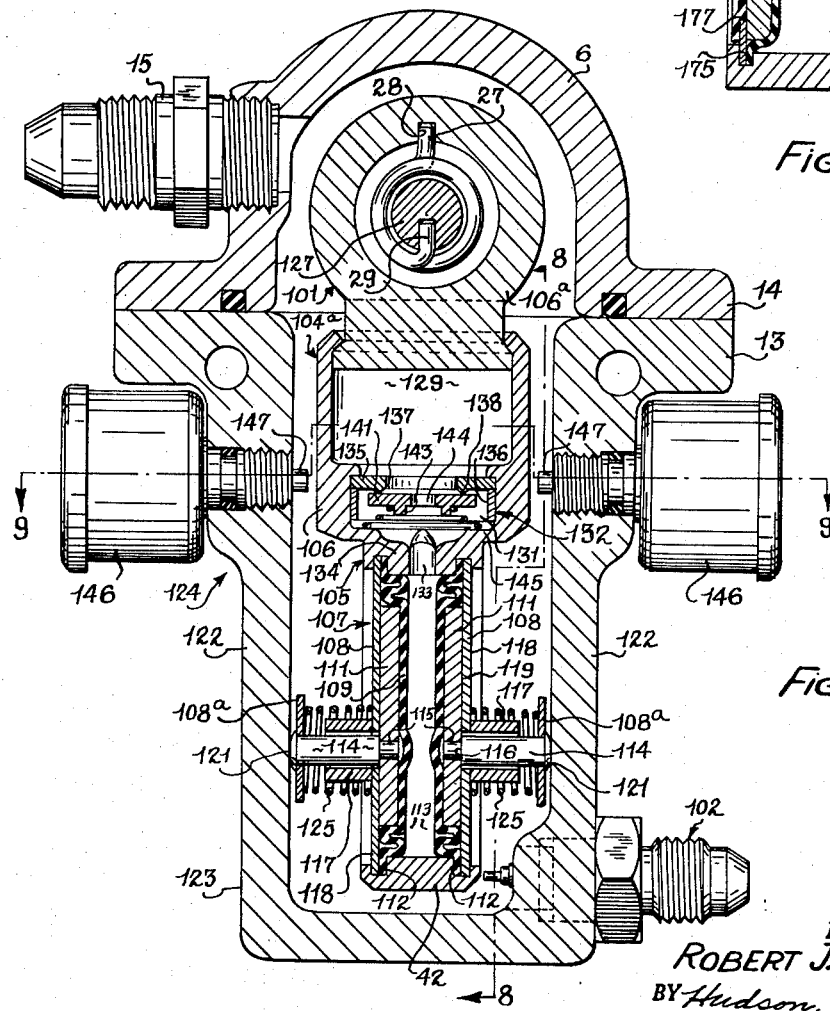

United States Patent Office 2,947,528
Patented Aug. 2, 1960

2,947,528

DAMPED AIR VALVE

Robert J. Broadwell, Cleveland, Ohio, assignor to The Gabriel Company, Cleveland, Ohio, a corporation of Ohio Filed Jan. 2, 1957, Ser. No. 632,155

3 Claims. (Cl. 267—1)

This invention relates to a novel control device or damped valve mechanism for controlling the movement of one member relative to another member, wherein either and/or both of said members may be movable, and is particularly applicable for use with a fluid pressure device which effects the relative movement of two movable members, wherein the relative movement of said members actuates the control device to positively control the functioning of said fluid pressure device.

Primary utility for the instant control device is realized upon its utilization in a pneumatic suspension system for automotive vehicles or the like wherein the body of a vehicle defining one movable member or mass is resiliently supported above the axles thereof by an air spring, said axles defining a second movable member or mass.

In the following detailed disclosure of several forms of the present invention said control device is shown and described for use in conjunction with the above type of vehicle pneumatic suspension system; however, it is to be understood that the control device may be applicable to other systems wherein control of the relative movement between several members may be desired.

Therefore, a primary object of the present invention is the provision of an improved control device for use with a fluid pressure device for controlling the relative movement of two movable members.

Another object is the provision of an improved control device as characterized in the preceding object and wherein said control device includes a shaft operatively connected to one member being oscillated thereby and which carries a pendant assembly normally positioned in an inactive position and which is movable by the shaft to selectively control the functioning of said fluid pressure device and thereby control the relative movement of said members in proportion to the movement of said one member connected to the shaft.

Still another object of the present invention is the provision of an improved control device as characterized in the last two preceding objects and wherein the pendant assembly is resiliently coupled to the shaft and movable thereby and operable at a point remote from said coupling to selectively control the functioning of said fluid pressure device and thereby control the relative movement of said members and wherein the pendant assembly is additionally provided with damping or delay means operative to delay the movement of shaft.

Another object of the present invention is the provision of an improved control device for use in connection with a resilient air spring in a pneumatic vehicle suspension system for supporting the body of a vehicle above its riding axles in a predetermined spaced relationship, wherein the control device includes a shaft connected to either one of the vehicle members and oscillated in response to a relative movement of either of said vehicle members to actuate said control device and change the resiliency of said air spring in proportion to the movement of either and/or both of said vehicle members.

Still another object of the present invention is the provision of a novel control device as characterized in the preceding objects and wherein thermoresponsive means are adapted to be actuated from a remote position relative to said control device to cause inflation or deflation of the air springs.

The invention may be briefly summarized as consisting in certain constructions and combinations and arrangements of parts, and further objects and advantages will be apparent from the following description of several preferred forms of the invention, reference being made to the accompanying drawings which form a part of this specification and wherein, Fig. 1 is a sectional view taken substantially on line 1—1 of Fig. 2, and illustrates one embodiment of a control device embodying the present invention, certain of the parts being shown in elevation;

Fig. 2 is a sectional view taken on line 2—2 of Fig. 1, and shows the valve actuating and damping mechanism of the control device of Fig. 1 in its central or inactive position within the housing;

Fig. 3 is a transverse sectional view taken substantially on line 3—3 of Fig. 2 looking in the direction of the arrows;

Fig. 4 is a fragmentary sectional view taken substantially on line 4—4 of Fig. 1 showing a portion of the housing of the control device and a valve mechanism mounted therein for connecting a source of pressure fluid thereto;

Fig. 5 is a fragmentary sectional view taken substantially on line 5—5 of Fig. 1 and shows another valve mechanism mounted in the housing for connecting the control device to the atmosphere;

Fig. 6 is a wiring diagram illustrating in schematic form an electrical circuit which may be utilized for energizing the thermoresponsive devices of the control member of the present invention which provide for remote actuation thereof;

Fig. 7 is a sectional view similar to Fig. 2 but of a second form of control device embodying the present invention;

Fig. 8 is a fragmentary sectional view taken substantially on line 8—8 of Fig. 7;

Fig. 9 is a transverse sectional view taken substantially on irregular line 9—9 of Fig. 7 looking in the direction of the arrows and shows the thermoresponsive devices of the control device mounted in the housing on opposite sides thereof;

Fig. 10 is a fragmentary sectional view of a third embodiment of the invention showing another type of torque coupling between the shaft and armature of the control device;

Fig. 11 is a detached perspective view illustrating the split sleeve spring utilized in the torque coupling of the embodiment of Fig. 10, and Fig. 12 is a sectional view of another form of damping mechanism detached from the housing.

In the following detailed description, the pneumatic suspension system (not shown) shall be considered as of the type referred to above utilizing air springs of known construction and which air springs support a vehicle body above its axles; said air springs being adjustable by the control or actuating device of the present invention to maintain said body above said axles in a predetermined spaced relationship.

Assuming that the vehicle body is supported above the axles in their normal riding relationship, then loading of the body would compress the air springs whereby the said body is lowered toward the axles. To prevent this the relative movement between said vehicle members functions to actuate the control device to introduce a pressurized fluid, preferably air, to said air springs to return said body to its normal riding position. In like manner, if the mass of the body is lessened, the air springs would tend to cause said body to rise farther above the axles and this is prevented by actuation of the control device through the relative movement of said vehicle members whereby the air springs are connected to the atmosphere and deflated in accordance with the diminishing load whereby the body is maintained at its normal riding height relative to the axles.

Additionally, assuming that the vehicle is traveling over an irregular roadway whereby the vehicle members are rapidly forced slightly toward or away from each other, then the damping and delay mechanism of the control device of the present invention is operative to prevent rapid inflation and/or deflation of the air springs which might eventually cause said air springs to be deflated and would impose undue working conditions on the air compressor of the system.

Further, assuming that the vehicle is traveling over a winding roadway causing side tilting or swaying of the vehicle body whereby the air springs on the opposite sides of the vehicle body may be compressed or extended thus varying their internal pressures, the control device is operated to prevent said momentary tilting or swaying movements of the vehicle body relative to the axle causing momentary inflation or deflation of the air springs.

Referring now to the drawings, the control device of the present invention shall be described hereinafter merely for purposes of illustration as controlling one air spring, but it is understood that several or more of said air springs may be controlled thereby, and in the form shown in Figs. 1 to 5 inclusive, includes a housing 4 in which an oscillatable shaft 5 is journalled. The housing is adapted to be attached to either vehicle member, the body or the axles, while the shaft is connected to the other of said vehicle members. As shown in Figs. 1 and 2, the housing 4 comprises an upper head portion 6 provided with a boss 7 on each end thereof. A central bore 8 provided in one of said bosses is adapted to receive a suitable bearing 9 in which the shaft 5 is journalled. The opposite end of said shaft is journalled in a bearing 10 carried by a sleeve 10a which is in turn threadably secured in the opposite boss 7. Said housing 4 also includes a box-like casing 11 attached to the lower end of head portion 6, by means of engaging flanges 13 and 14 through which extend suitable fastening means (not shown) are extended. An internal cavity 12 is defined by said attached head portion and casing.

The head portion 6 of the housing 4 is provided with a threaded sleeve 15 communicating with cavity 12 for receiving one end of a conduit (not shown), the other end of which is connected to an air spring of the suspension system. The casing 11 adjacent its lower end is provided with sleeve fittings 16 and 17 which communicate with said cavity 12 and mount valves (later to be described) selectively actuated in response to the movement of the shaft 5 to connect the air spring through the cavity 12 to the aforesaid source of air pressure to inflate the air spring or to the atmosphere to deflate said air spring.

To accomplish this actuation of said valves the shaft 5 mounts a pendant assembly 21 comprising a substantially tubular shaped spring housing 22 extending longitudinally of the cavity 12 and shaft 5. The spring housing 22 is preferably constructed of a microscopically porous material such as, sintered iron, which permits passage therethrough of pneumatic fluid or air for a purpose to be explained later. The pendant assembly is resiliently coupled to the shaft 5 by means of a pair of helical springs 24 and 25 surrounding said shaft, the ends of which are bent substantially normal to the axis of said shaft to form key fingers 27 and 29. The outer finger 27 of each spring is inserted in a longitudinally extending slot or keyway 28 formed in the spring housing 22, and in like manner the inner finger 29 of each spring is inserted in a groove or keyway 31 formed in the shaft 5.

With the above resilient coupling provided between the shaft 5 and pendant assembly 21 it will be realized that when the shaft is rotated, for instance, clockwise as viewed in Fig. 2, the torsional effect of spring 25 will be increased and that of spring 24 will be decreased. Similarly, when the shaft is rotated in the opposite direction, the reverse torsional effect to that described will be produced. It will also be realized that the resilient spring coupling enables the shaft 5 and pendant assembly 21 to oscillate relative to each other as well as together, and presents a resisting torque which must be overcome before said shaft can swing the pendant assembly.

The pendant assembly 21 also includes a damping or delay and valve actuator device 33 consisting of a diaphragm housing 34 provided on its upper end with an integral upwardly facing cup-shaped portion 35. The annular wall 36 of said cup-shaped portion 35 receives within it and closely fits the annular wall of an inverted cup-shaped portion 37 extending downwardly from the spring housing 22. The annular wall 36 is flanged or spun inwardly to form an annular lip 39 that engages an annular external shoulder 41 on the portion 37 to rigidly secure said portions together. The diaphragm housing 34 at its lower end includes a valve actuating flange 42 movable with the housing 34 in one direction of rotation of the shaft 5 to actuate the valve mechanism in the sleeve fitting 16 and movable therewith in the opposite direction of rotation of said shaft 5 to actuate the valve mechanism in the sleeve fitting 17 in a manner now to be described.

Although the sleeve fittings 16 and 17 may be provided with any suitable type of valve mechanisms they will be shown and described herein as provided with the usual valve cores or insides such as are employed in the valve stems of pneumatic tires, since said cores or insides are readily available and easily mounted in position. The sleeve fittings 16 and 17 are externally threaded so as to be screwed into threaded openings formed in the lower portion of the housing 4. The fitting 16 is provided with a bore 44 therethrough shaped in the manner of the bore in the usual valve stem and into which bore a valve core or insides can be screwed as will be well understood in the art.

The bore in the fitting 16 is so shaped that the valve core or insides screws into the same from the inner end of the fitting while the end of the valve pin 46 above the swivel bridge of the valve core extends into the cavity 12 to a position to be engaged by the flange 42 when the assembly 21 swings in one direction.

The sleeve fitting 17 is similarly provided with a bore therethrough, but such bore is reversed as compared to the bore 44 in the fitting 16. The valve core or insides is screwed into the fitting 17 from the outer end of the latter and is modified from the usual valve core or insides to the extent that the valve pin thereof is provided with an extended end 47 inwardly of the valve proper 48 of the valve insides. This extended end 47 passes through a slot 49 in the flange 42 and is provided on its inner end with a head 51 wider than the width of said slot.

It will be seen that when the shaft 5 is rocked in one direction to swing the pendant assembly 21 and flange 42 counterclockwise, as viewed in Fig. 4, the flange 42 engages the valve pin 46 and depresses or pushes the same to open the valve proper of the valve core 45 in the sleeve fitting 16 to connect the source of pressurized air attached to said fitting to the cavity 12, which, in turn, is connected through the sleeve 15 to the air spring. Conversely, when the shaft 5 rocks in the opposite direction the assembly 21 and flange 42 are swung clockwise, as viewed in Fig. 5, so that the flange 42 acts on the head 51 of the pin extension 47 to pull the pin of the valve core in the sleeve 17 and thus unseat the valve proper 48 of this core, whereupon the cavity 12 is connected to atmosphere and the air spring can exhaust.

Although the several embodiments illustrated and described herein show the valve mechanisms carried in the sleeve fittings 16 and 17 as mounted adjacent to each other in the same vertical side wall of the housing 4 it is also contemplated that said valve mechanisms may be mounted on opposite side walls thereof and actuated by the same swinging movement of the pendant assembly 21.

The control device of the present invention is intended to be operable to effect inflation or deflation of the air spring only in response to slow relative movements between the vehicle body and axle, and is ineffective to cause adjustments of said air spring in response to the more rapid movements between the members of said vehicle as are caused by operating the vehicle over a rough or winding roadway.

To accomplish this a damping mechanism is incorporated into the control device which, in conjunction with the resilient torsional coupling between the shaft 5 and pendant assembly 21, provides a delay device which causes actuation of the inlet and exhaust valve mechanisms in response only to movements between the vehicle members that are of prolonged duration such as result from the unloading or loading of the body.

More specifically, the damping mechanism is carried by the diaphragm housing 34 and includes a pair of normally spaced opposed damping assemblies 53, each comprising a fixed closure plate 54 and a flexible diaphragm 55 and a backing disk 56 interposed between the plate 54 and diaphragm 55. The damping assemblies 53 are placed in the diaphragm housing 34 in relative parallel spaced relationship. The circumferential edge of each diaphragm 55 is anchored in an annular recess formed in the housing 34. The normally spaced apart diaphragms 55 provide therebetween a pressure chamber 58 normally filled with oil. An actuating plunger 59, having a reduced inner end portion 59a defining a shoulder 60, is slidably mounted centrally in each diaphragm assembly 53, extending substantially perpendicularly relative thereto and has said reduced end in engagement with the flexible diaphragm 55 and its shoulder 60 abutting against the outside face 61a of the backing disk 56. An annular flange 61 is formed on the opposite end of each plunger and is arranged to be in pressure engagement with the vertical side wall 62 of the casing 11 by means of a spring member 64 surrounding said plunger and interposed between the closure plate 54 and said flange 61. These springs are operable in conjunction with the aforesaid resilient coupling to normally position the pendant assembly 21 and attached damping and valve actuating device 33 centrally and vertically within the housing cavity 12 and also to assist in opposing movement of said device in response to relative movement between the vehicle body and axles that are below a minimum magnitude and functioning period.

The damping mechanism also includes a fluid reservoir 66 provided in the inverted cup-shaped portion 37 of the spring housing 22 and which communicates with the pressure chamber 58 through a replenishing valve mechanism 67. Said valve mechanism comprises a valve plug 69 threadably secured in an opening 71 formed in the base of the cup-shaped member 35 of the assembly 33 and which has a port 72 extending centrally therethrough. A valve seat 73 is formed on the bottom surface 74 of the plug surrounding said port 72. A disk valve 77 is adapted to engage seat 73 and is provided centrally with a tubular stem 76 that extends into the port 72. A spring 78 acts to normally seat the disk valve 77. An orifice 79 is placed centrally through the tubular stem 76 and disk valve 77 and connecting to the pressure chamber 58 and fluid reservoir 66. A supply of fluid, such as oil, is disposed in the pressure chamber 58 and this is normally done prior to attaching the pendant assembly 21 to the shaft 5 whereby fluid is prevented from being accidentally spilled into the housing cavity 12.

As has been mentioned previously, the damping mechanism causes the control device to effect adjustment of the air spring of the pneumatic suspension system only in response to relatively slow movements between the vehicle members that are of prolonged duration. To effect this result and assuming that a turning force in response to the aforesaid movement is exerted on the shaft 5, the resistance offered by the previously described torsional coupling is overcome and the pendant assembly 21 swings with the shaft whereby one of the plungers 59 depending upon the direction of rotation of said shaft, is pressed into the diaphragm assembly 53 and forces its associated flexible diaphragm 55 and backing disk 56 inwardly causing the fluid to be displaced from the pressure chamber 58 and into the fluid reservoir 66 at a relatively slow rate through the orifice 79 of replenishing valve mechanism 67. It is realized that the pressure exerted by the diaphragm and the length of the stem 76 and size of the orifice 79 determines the period it takes for a predetermined quantity of fluid to be displaced therethrough and this period may be selectively determined by changing the configuration of said orifice and/or the resistance offered to the swinging of the pendant assembly without departing from the inventive concepts described herein. The resistance exerted by said fluid is thereby gradually diminished, and after a definite period of time has elapsed, the force on the shaft is of sufficient magnitude to swing the pendant assembly 21 and actuate one of the valve mechanisms 16 or 17, depending upon the direction of movement of the shaft 5.

As previously mentioned, the control device of the present invention, when utilized with a conventional vehicle, is usually attached thereto such that the housing 4 is connected to the axles and the shaft 5 is operatively connected to the body by means of any suitable linkage which will apply a rotating force to said shaft when the spaced relationship between said vehicle members is changed. With this relationship established, then as the spaced relationship between said vehicle members is decreased, such as by increasing the load of the body, the rotatable force on the shaft is of such direction as to actuate valve mechanism 16 whereby the air spring is connected to the source of fluid pressure and is inflated. When the rotatable force on said shaft is in the opposite direction, such as is provided when the load on the body is decreased, valve mechanism 17 is actuated whereby said air spring is deflated.

When the air spring has been adjusted in response to the actuation of the respective valve mechanism, the vehicle members are again positioned in their normal "safe riding" spaced relationship, and the shaft is rotated in the opposite direction by said repositioning vehicle members whereby the pendant assembly 21 is returned to its normal position centrally within the housing cavity 12. When this occurs, the spring 64 surrounding the actuated plunger 59 forces the latter outward whereby the flexible diaphragm returns to its normal position. This movement of the diaphragm increases the volume of the pressure chamber 58 sufficiently to cause the pressure thereof to decrease whereby the displaced fluid in the reservoir 66 actuates the replenishing valve mechanism 67. The fluid in said reservoir then flows past the valve mechanism and into the pressure chamber to replenish the same. The flow of fluid from the reservoir to the pressure chamber is accelerated due to the porous characteristics of the spring housing 22 which enables the pneumatic pressure of the air spring to be also realized in the reservoir. When the volume of the pressure chamber 58 is increased, the pressure in said chamber is decreased thereby creating a positive differential in pressure between the reservoir and said pressure chamber which acts to force the fluid from the reservoir into the pressure chamber thereby rapidly increasing the rate of replenishment thereto.

When one of the diaphragm assemblies 53 is actuated, as above described, the backing disk 56 and diaphragm 55 thereof are moved into the pressure chamber 58 creating a narrow pocket (not shown) between the closure plate 54 and said backing disk 56. Since pressure fluid in the cavity 12 may flow into said pocket through the aperture 80 in the closure plate 54 provided therein for the extension of the plunger 59 therethrough and create entrapped pressure fluid which would retard the return movement of the pendant assembly to its central position. A plurality of spaced openings 80a, Fig. 1, are provided in the closure plate 54.

As previously mentioned, the spring housing 22 is preferably constructed of a microscopically porous material, such as sintered iron, which permits said housing to "breathe." The air spring is connected to the cavity 12 of the housing 4 whereby said pneumatic pressure is also present in said cavity. Additionally, because of the porous characteristics of the spring housing 22, this pneumatic pressure is also present in the reservoir 66 and the pressure chamber 58. Therefore, under normal riding conditions the prevailing pressure is each of the above noted chambers, due to the penumatic fluid pressure of the air spring, is substantially equal. Assume, then, that the vehicle is traveling over a winding roadway whereby the body of the vehicle is periodically tilted from side to side toward its riding axles and the air spring is compressed to result in increasing the pneumatic pressure therein. Also due to the change in the spaced relationship between the vehicle members, the shaft 5 of the control device is oscillated accordingly and tends to swing the pendant assembly 21. However, the increase in the pneumatic pressure of the air spring is communicated through the housing 22 to the reservoir 66 resulting in increasing the pneumatic pressure of said reservoir and providing a positively acting differential in pressure between the reservoir 66 and pressure chamber 58 which retards the transference of the hydraulic fluid from the pressure chamber in said reservoir. The pendant assembly 21 is thereby prevented or delayed from being moved to a valve actuating position and therefore, the air spring is not adjusted. Under normal roadway conditions, the tilting of the body of the vehicle is not sustained over a period of time sufficient to overcome said retarding phenomenon, and, consequently, upon the vehicle returning to a substantially straight portion of roadway, the force tilting said body will be removed and the vehicle members will return to their "safe-riding" spaced relationship. The shaft 5 will return the pendant assembly 21 to its central inoperative position in the housing 4, and the air spring will also be returned to its normal degree of resiliency whereby the pneumatic pressure of the several chambers of the housing caused by the pneumatic fluid of said air spring is again equalized.

Therefore, from the foregoing description, it is realized that a definite period of time is required in which to overcome the delay caused by the delay and valve actuator device 33 of the control device. Accordingly, only forces resulting from a sustained movement between the vehicle members over a predetermined period of time are effective to actuate the control device of the present invention. Additionally, it is also realized that said sustained forces must be greater than a predetermined minimum magnitude in order to overcome the static resistance exerted by the torsional coupling between the shaft 5 and pendant assembly 21 and that of said damping device.

It is also proposed to initiate actuation of the control device of the present invention from a remote position such as from the operator's station in the vehicle. This is desirable, for instance, whenever the mass of the vehicle above the front or rear axles is increased or lessened, resulting in tilting of said body relative to the axles. To permit said remote actuation, an electrical and thermoresponsive mechanism is incorporated into the control device and includes a thermoresponsive device 81 of conventional construction, such as is utilized in water cooling systems wherein a thermoresponsive element is movable upon an increase in temperature to permit water to flow throughout the system and, in like manner, functions upon a predetermined decrease in temperature to prevent said flow of water. One of said thermoresponsive devices 81 is mounted in each side wall 62 of the container 11 and has a plunger 82 attached to its movable thermoresponsive element and extending into housing cavity 12 adjacent the edge of the diaphragm housing 34. A heating element, referred to schematically in Fig. 6 by the numeral 83 is included in each of said devices to provide a medium for producing the temperature differential necessary to actuate said thermoresponsive element.

Referring now to Fig. 6, the electrical circuit utilized in the present instance to actuate said thermoresponsive mechanism is shown to include a source of electrical energy, such as the usual battery 84 of the vehicle and a switch 85 which may be mounted upon the instrument panel at the operator's station and which has three positions of operation, namely, a neutral position wherein the circuit is inoperative; an "up" position whereby one of said heating elements is connected to the battery, and a "down" position wherein the other of said heating elements is connected to the battery. This is accomplished by having one end of each heating element 83 connected to a common end of the battery, in this instance, the negative terminal thereof, by means of conductors 86 and 87, and the opposite end of one of said elements connected through conductor 88 to switch terminal 89 defined as the "up" position terminal. The opposite end of the remaining heating element is connected through conductor 91 to switch terminal 92 defined as the "down" position terminal, and the opposite end of the battery is connected through conductor 93 to the switch arm 94. It will now be seen that upon moving the switch arm 94 into contact with either of said terminals 89 or 92 one of said heating elements 83 is connected across the battery 84, whereby the thermoresponsive element associated therewith is heated and causes its plunger 82 to engage the diaphragm housing 34 to swing the shaft 5 and pendant assembly 21, whereby either one of the valve mechanisms 16 or 17 is actuated to connect the air spring to the source of pressurized air or to the atmosphere for inflation or deflation of said air spring respectively.

It is also realized that the thermoresponsive mechanism may also be utilized for additional purposes other than has been described, such as for raising the forward and/or rearward end of the vehicle to facilitate maintenance thereupon, or to disengage interlocked bumpers in the event of a collision with another vehicle.

In the embodiment of Figs. 7 to 9 inclusive the general construction of control device is similar to the previously described form, however the damping mechanism of the pendant assembly 101 provides a delay period of longer duration relative to that of the previous embodiment before permitting actuation of its valve mechanisms 102 and 103, and includes a delay and valve actuator device 104a mounted on the pendant assembly 101. Said device comprises a cylindrical housing 105 integrally formed on its upper end with an upwardly facing cup-shaped member 106 which is attached to the spring housing 106a in a manner similar to that described above. A pair of diaphragm assemblies 107 each comprising a closure plate 108 and a flexible diaphragm 109 with a backing disk 111 interposed therebetween are placed in the housing 105 with the peripheral edges of said plate and diaphragm disposed in spaced annular recesses 112 defining a pressure chamber 113 therebetween which receives a quantity of oil. An elongated plunger 114 having a reduced end 115 defining a shoulder 116 is slidably mounted in each diaphragm assembly 107 passing through a sleeve 117 fixed to the outside face 118 of each closure plate 108, and as shown in Figs. 7 and 8, is mounted at a point spaced vertically below the center thereof. Said plunger extends substantially perpendicularly through the diaphragm assembly and has its reduced end 115 in engagement with the flexible diaphragm 109 and the shoulder 116 thereof in abutment with the outside face 119 of the backing disk 111. An annular head 121 mounted on the opposite end of said plunger is in pressure engagement with the vertical side wall 122 of the casing 123 of the housing 124 by means of a spring 125 surrounding said pin and sleeve and interposed between the pressure plate 108 and a washer 108a carried by said plunger.

It is seen that in the instant construction the lever arm established between the shaft 127 and the point of application of the plungers 114 of the delay and valve actuator device upon the pressure chamber 113 is longer than that of the previous embodiment. Therefore, the resisting force provided by the damping mechanism has a greater effect in resisting the swinging of the pendant assembly 101 by the shaft 127. The shaft, therefore, must be oscillated through a greater arc whereby the torque coupling between said shaft and the pendant assembly is increased before said resistance of the damping mechanism is overcome to enable the swinging of the pendant assembly.

With reference to Fig. 7 the housing 105 of the instant embodiment also is provided with a fluid reservoir 129 in the cup-shaped member 106 and which communicates with a valve chamber 131 provided therebelow through a replenishing valve mechanism 132. An enlarged port 133 provided in the base 134 of the valve chamber 131 connects with the pressure chamber 113. Said valve mechanism comprises a plate 135 extending horizontally across the upper end of the valve chamber 131 and supported upon an upstanding cylindrical sleeve 136. An opening 137 is formed centrally through the plate 135 and connects said valve chamber to the fluid reservoir 129. A valve seat 138 is provided on the underside surface of the plate 135 surrounding said opening. A disk valve 141 is adapted to engage the seat 138 and is provided centrally thereof with a short tubular stem 143 that extends downwardly into the valve chamber 131. An orifice 144 extends centrally through said stem and connects the valve chamber 131 to said fluid reservoir 129. A conical-shaped spring 145 is interposed between the base 134 and said valve and acts to normally seat the disk valve 141. It will be noted that the disk valve 141 does not require a positive guide since the conical-shaped spring 145 acts as a self-centering means to correctly position the same upon said valve seat. It will be further noted that the short length of the stem 143 and the increased diameter of the orifice 144 in the present form offer less resistance to the flow of fluid between the pressure chamber 113 and the reservoir 129. The diameter of the port 133 and opening 137 of the instant valve mechanism, being somewhat larger than the equivalent operative elements of the previous embodiment, also offers less resistance to the flow of the fluid between the pressure chamber 113 and reservoir 129. Therefore, it is realized that by changing the physical characteristics of the valve mechanisms and damping mechanisms of each of the disclosed forms of the control device, the delay period of the damping cycle may be regulated.

The thermoresponsive devices 146 of the present embodiment are similar to the devices 81 utilized in the previous embodiment. However, as shown in Figs. 7 and 9, said devices 146 are mounted in the upper end of housing casing 123 whereby the movable plungers 147 thereof extend radially toward the delay and valve actuator device 104a and are positioned to engage the cup-shaped member 106 at diametrically opposite points, thereby exerting a more effective force thereon to swing the pendant assembly 101.

The embodiment of Figs. 10 and 11 inclusive illustrates another form of torque coupling between the shaft and pendant assembly of the instant control device. More specifically, the heretofore mentioned helical springs 24 and 25 of the previous embodiments are replaced by an elongated cylindrical spring sleeve 153 split longitudinally thereof to define a narrow opening 154. The sleeve is mounted on the shaft 151, being disposed within the spring chamber 154a of the pendant assembly 152. A pair of blind holes 155 placed in the shaft, being longitudinally spaced one from the other, are each adapted to receive one end of a pin 156. Said pin extends radially outwardly of the shaft and into and through the longitudinal opening 154 in said sleeve. An aperture 157 placed in the pendant assembly 152 is adapted to receive one end of pin 158, the opposite end of which extends into said opening in the sleeve 153 intermeidate the pins 156. It is therefore seen that any turning movement exerted upon the shaft 151 is transmitted to the pendant assembly 152 by means of the pins 156 engaging either of the longitudinally extending edges 159 or 161 of the sleeve 153 defining said opening 154, depending upon the direction of rotation of said shaft. Said turning movement is then transmitted through the pin 158 mounted in said pendant assembly and engaging the opposite longitudinally extending edge 159 or 161.

The embodiment of Fig. 12 illustrates another form of damping mechanism which may be utilized in place of the damping mechanisms described in the previous embodiments. Specifically, the damping mechanism of the instant form comprises a substantially cylindrical housing 165 mounting a pair of flexible diaphragm assemblies 166 in a predetermined spaced relationship defining a pressure chamber 167 therebetween. The upper end of the housing is integrally provided with an upwardly facing cup-shaped member 168 which is attached to the spring housing (not shown) in a manner similar to that described above and defines a reservoir 169. The base 170 of the reservoir is provided with an orifice 171 connecting to the pressure chamber 167 and said reservoir 169.

The diaphragm assemblies 166 each comprises a flexible diaphragm 172 which extends over the inside surface of the backing disk 173 and has its peripheral edge anchored in an annular slot 174 in the housing. A flat rigid ring or washer 175, which has its peripheral edge anchored in said annular slot, extends radially inwardly toward the axis of the disk 173 and overlies a portion of the outside face 179 of the backing disk 173. A flat flexible ring 176 has its outer annular portion 177 suitably fastened to the outside surface of the ring 175. The remaining annular portion 178 of said flexible ring 176 is suitably fastened to the outside face 179 of the backing disk 173 and is movable therewith. An elongated plunger 180 having a reduced end 181 defining a shoulder 182 is mounted centrally in the backing disk 173 with said reduced end 181 engaging the flexible diaphragm 172 and the shoulder 182 in abutment with the outside face 179 of said backing disk 173. The outer end of the plunger 180 is arranged to engage the walls of the housing in the usual manner.

Under normal riding conditions for the vehicle, wherein the body is carried above its riding axles in the heretofore mentioned "safe-riding" spaced relationship, the same pneumatic fluid pressure of the connected air spring is present throughout the cavity of the housing (not shown) and also the reservoir 169 and pressure chamber 167 due to the microscopic porous construction of the spring housing as previously described. It is seen, that in the instant form of damping mechanism the effective area of the movable surface of each flexible diaphragm assembly 166 in communication with the cavity, namely, the outside face 179 of the backing disk 173 and the portion 178 of the flexible ring 176 attached thereto, is slightly less than the effective area of the movable surface of each of said assemblies 166 in communication with the pressure chamber 167, namely, the surface area of the portion of the flexible diaphragm 172 overlying the backing disk 173. Therefore, under normal riding conditions as above described, the force exerted by the same pneumatic fluid pressure upon the different effective areas of the damping mechanism results in a differential pressure acting outwardly on each flexible diaphragm 172 toward the walls of the housing to normally maintain each plunger 180 in engagement with the opposite walls of the housing.

Assuming that the central device has been actuated in a manner as described in the previous embodiments and the air spring has been adjusted accordingly, when the shaft of the control device is oscillated in the opposite direction as the vehicle members are returned to their "safe-riding" spaced relationship, the damping mechanism is returned to its inactive central position in the housing cavity and said differential pressure acting on each flexible diaphragm returns the plunger to its rest position. Therefore, it is realized that in the instant form of damping mechanism, the return spring for each plunger, such as return spring 125 of the embodiment of Fig. 7 is not required, thereby resulting in a more economical and positive-acting construction.

Having described several preferred embodiments it is realized that the present invention is susceptible of numerous modifications and combinations that are within the spirit and scope of the appended claims.

Having thus described my invention, I claim:

1. In a retarded valve actuator, a housing having a cavity, a shaft journalled in said housing for oscillation relative to the housing, actuating means carried by said shaft within said cavity for movement in opposite directions, said actuating means including a first portion surrounding said shaft, and a pendant portion connected to the first portion provided with a fluid reservoir, damping means carried by said pendant portion, said damping means including a chamber containing a pressure fluid communicating with said reservoir, and means effective in response to movement of said actuating means to vary the chamber for retarding movement of said actuating means, said first portion being of porous construction whereby air pressure in the cavity and in the reservoir is substantially equal.

2. An actuator as defined in claim 1 in combination with a spring pressed replenishing valve carried by the pendant portion between the reservoir and the chamber to control the flow of fluid between the chamber and the reservoir.

3. In a retarded valve actuator, a housing having a cavity, a shaft journalled in said housing for oscillation relative to the housing, actuating means carried by the shaft within said cavity for oscillating movement in opposite directions, said actuating means including a hollow tubular portion surrounding the shaft, and a pendant portion connected to the tubular portion and extending outwardly therefrom, a torque coupling including resilient means surrounding by said tubular portion and operatively connected to said shaft and to said tubular portion, said pendant portion being provided with a fluid reservoir, damping means carried by said pendant portion and including a pair of flexible diaphragms mounted within the pendant portion in spaced relation to define therebetween a single pressure fluid containing chamber communicating with said reservoir, said diaphragms being spaced in a direction which is generally perpendicular to a plane which includes the axis of said shaft, a separate plunger associated with each of the diaphragms for engagement with opposite interior walls of the housing upon movement of the actuating means in opposite directions to move the diaphragms relative to each other to vary the pressure fluid chamber, and means carried by the pendant portion intermediate said reservoir and said chamber to control the flow of fluid between the chamber and reservoir.

References Cited in the file of this patent

UNITED STATES PATENTS

| | | |
|---|---|---|
| 1,895,477 | McCure | Jan. 31, 1933 |
| 1,988,690 | Kettle | Jan. 22, 1935 |
| 2,055,133 | Newell | Sept. 22, 1936 |
| 2,129,084 | Dorman | Sept. 6, 1938 |
| 2,270,951 | Jeffrey | Jan. 27, 1942 |
| 2,579,334 | Plank | Dec. 18, 1951 |
| 2,588,798 | Bone | Mar. 11, 1952 |
| 2,593,906 | Markson | Apr. 22, 1952 |
| 2,644,699 | Weiertz | July 7, 1953 |
| 2,670,201 | Rossman | Feb. 23, 1954 |
| 2,819,777 | Kosch | Jan. 14, 1958 |

FOREIGN PATENTS

| | | |
|---|---|---|
| 4,539 | Great Britain | of 1878 |

OTHER REFERENCES

Germany (Kl. 63c 50), 1,007,191, printed Apr. 25, 1957.